(12) United States Patent
Greiner

(10) Patent No.: US 9,109,543 B2
(45) Date of Patent: Aug. 18, 2015

(54) EXHAUST MANIFOLD FOR AN INTERNAL COMBUSTION ENGINE, IN PARTICULAR IN MOTOR VEHICLES

(71) Applicant: MAN Truck & Bus AG, Munich (DE)

(72) Inventor: Manfred Greiner, Kirchensittenbach (DE)

(73) Assignee: MAN TRUCK & BUS AG, Munich (DE)

( * ) Notice: Subject to any disclaimer, the term of this patent is extended or adjusted under 35 U.S.C. 154(b) by 27 days.

(21) Appl. No.: 14/056,327

(22) Filed: Oct. 17, 2013

(65) Prior Publication Data

US 2014/0109572 A1   Apr. 24, 2014

(30) Foreign Application Priority Data

Oct. 18, 2012   (DE) .......................... 10 2012 020 443

(51) Int. Cl.

| | |
|---|---|
| *F01N 3/00* | (2006.01) |
| *F01N 3/02* | (2006.01) |
| *F01N 3/10* | (2006.01) |
| *F01N 3/20* | (2006.01) |
| *F02M 25/07* | (2006.01) |
| *F01N 13/10* | (2010.01) |
| *F02B 37/02* | (2006.01) |

(52) U.S. Cl.
CPC ........... *F02M 25/0704* (2013.01); *F01N 13/10* (2013.01); *F02B 37/02* (2013.01); *F02M 25/0713* (2013.01); *F02M 25/0717* (2013.01); *F01N 2240/20* (2013.01); *F02M 25/0707* (2013.01); *Y02T 10/121* (2013.01); *Y02T 10/144* (2013.01)

(58) Field of Classification Search
USPC ............ 60/313, 323, 602, 605.2; 123/184.61, 123/568.11
See application file for complete search history.

(56) References Cited

U.S. PATENT DOCUMENTS

2013/0037009  A1 *  2/2013  Omote et al. ............ 123/568.11

FOREIGN PATENT DOCUMENTS

| | | | |
|---|---|---|---|
| DE | 10 2006 016 432 A1 | 10/2007 | |
| WO | WO 2011/136088 | * 11/2011 | |

* cited by examiner

*Primary Examiner* — Audrey K Bradley
*Assistant Examiner* — Dapinder Singh
(74) *Attorney, Agent, or Firm* — Lucas & Mercanti, LLP

(57) ABSTRACT

An exhaust manifold for an internal combustion engine with exhaust turbocharging and an exhaust gas recirculation device, includes a header pipe with several inflow openings connected with the combustion chambers of the internal combustion engine via connecting pieces, and outlet openings branching from the header pipe via connecting branches for the exhaust gas recirculation and the exhaust turbocharger. To achieve a high exhaust gas recirculation rate and an effective pressurization of the exhaust turbocharger with exhaust gas, at least one flow guide element is arranged in the header pipe close to the outlet openings which divides the exhaust gas flow onto the two outlet openings in a targeted manner.

11 Claims, 4 Drawing Sheets

EXHAUST MANIFOLD FOR AN INTERNAL COMBUSTION ENGINE, IN PARTICULAR IN MOTOR VEHICLES

BACKGROUND OF THE INVENTION

The present invention concerns an exhaust manifold for an internal combustion engine, in particular in motor vehicles, with exhaust turbocharging and an exhaust gas recirculation device.

DE 10 2006 016432 A1 discloses an internal combustion engine with exhaust turbocharging and an exhaust gas recirculation device, wherein in a dual-flow exhaust manifold, an outlet opening for the exhaust gas recirculation branches from one flow while the two flows are brought together to a common outlet for the exhaust turbocharger. An overflow orifice is provided before the outlet opening for the exhaust turbocharger and is intended to have a positive influence on the pressure conditions in the flow with the exhaust gas recirculation opening.

SUMMARY OF THE INVENTION

The object of the invention is to control the flow conditions in the exhaust manifold with relatively simple means such that the pressurization of the turbine of the exhaust turbocharger is improved and at the same time a targeted exhaust gas recirculation can be achieved even when the internal combustion engine is not in steady operating mode.

According to the invention it is proposed that at least one flow guide element is arranged in the header pipe of the exhaust manifold close to the outlet openings for the exhaust gas recirculation and for the exhaust turbocharger, which element divides the exhaust gas flow onto the outlet openings in a targeted manner. Surprisingly, it has been shown that with this measure an effective pressurization of the exhaust turbocharger connected to the exhaust manifold can be achieved, which allows a single-flow design of the header pipe and a variable arrangement of the exhaust turbocharger, and which also requires high exhaust gas recirculation rates without the use for example of flutter valves to utilize the pressure fluctuations in certain operating states of the internal combustion engine.

Particularly preferably, the outlet openings for the exhaust gas recirculation and the exhaust turbocharger can be positioned between two inflow openings of the header pipe, wherein the flow guide element arranged between the adjacent inflow openings deflects the opposing exhaust gas flows onto the outlet openings. The exhaust gas thus flows into the outlet openings in a targeted manner and matched to the respective mass flows, whereby turbulence and flow resistances are largely avoided.

Here the outlet openings for the exhaust gas recirculation and to the exhaust turbocharger can branch from the header pipe substantially diametrically opposed, wherein the flow guide element with guide walls deflects the exhaust gas flow onto the outlet opening in a fluidically favourable manner.

The flow guide element can furthermore, in a manner favourable for production technology, be designed approximately Y-shaped in cross section with one guide wall oriented in the flow direction of the exhaust gas in the header pipe and two guide walls bending towards the outlet openings, and be cast on diametrically opposed wall segments of the header pipe between the adjacent inflow openings. Particularly preferably, the guide walls of the flow guide element can merge into each other with flow-deflecting curved segments.

In a particularly preferred embodiment of the exhaust manifold, on an approximately horizontal inflow of exhaust gas through the inflow openings, the outlet opening for the exhaust gas recirculation can be oriented transversely thereto upwards and the outlet opening to the exhaust turbocharger transversely thereto downwards, hence allowing a problem-free arrangement of the exhaust turbocharger on the internal combustion engine and a particularly suitable connection of the exhaust gas recirculation line, where applicable with integral exhaust gas cooler.

The preferably single-flow header pipe of the exhaust manifold can be adapted for the connection of at least two cylinders of the internal combustion engine, in particular for six cylinders arranged in-line, wherein the outlet openings for the exhaust gas recirculation and to the exhaust turbocharger are arranged between the last two inflow openings in the flow direction of the exhaust gas. This has a not insignificant influence on the flow conditions in the exhaust manifold, with an effective ram pressure charge of the exhaust turbocharger and a targeted division of the exhaust mass flow for the exhaust gas recirculation rate.

In an advantageous refinement of the invention, the wall segments opposite the inflow openings in the header pipe can be formed undulating such that viewed in the flow direction of the exhaust gas, the respective undulation peaks are positioned in front of the respective inflow openings. Thus a further improved alignment of the exhaust mass flow in the header pipe can be achieved, which in particular improves the response behaviour of the exhaust turbocharger and furthermore reduces a flow-induced exhaust backpressure at high engine rotation speeds. In addition also the connecting pieces or pipe guides surrounding the inflow openings and cast onto the header pipe can be formed inclined or curved in the flow direction of the exhaust gas in the header pipe.

BRIEF DESCRIPTION OF THE DRAWINGS

One embodiment example of the invention is explained in more detail below with reference to the enclosed diagrammatic drawing. Here.

DETAILED DESCRIPTION OF THE PREFERRED EMBODIMENTS

Figure 1:
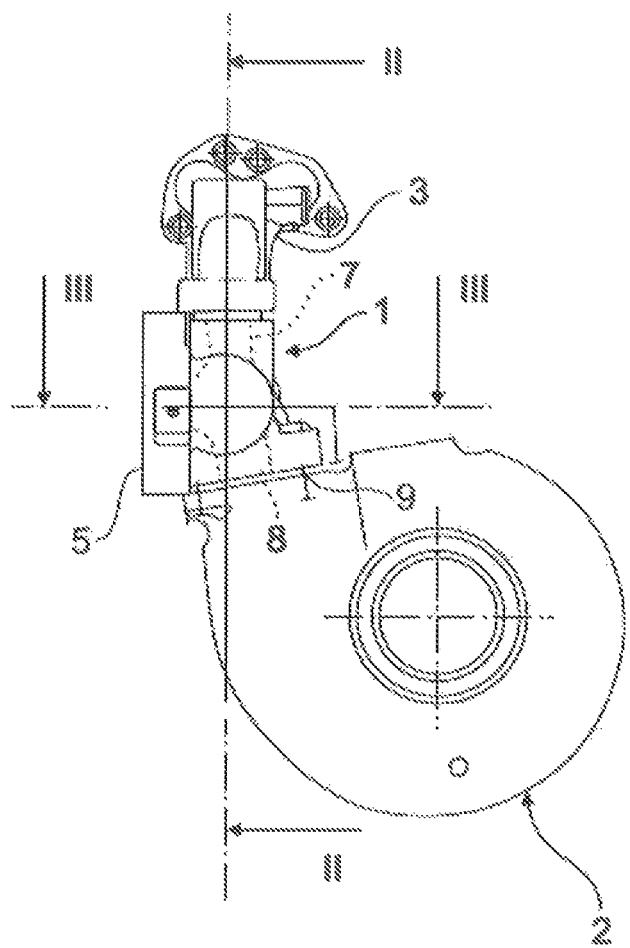
FIG. 1 shows a view in the direction of arrow I in FIG. 2 onto the exhaust manifold for an in-line internal combustion engine for motor vehicles, with an exhaust turbocharger connected to the exhaust manifold and a connected pipe connector for an exhaust gas recirculation line.

FIGS. 1 to 4 show an exhaust manifold 1 which can be attached to an internal combustion engine, in particular for motor vehicles, with cylinders arranged in at least one line (in-line combustion engine or cylinder bank of a V-engine) and to which are connected the turbine of an exhaust turbocharger 2 (not described further) and a pipe connector 3 of a branching exhaust gas recirculation line (not shown) for an exhaust gas recirculation device of the conventional type.

The exhaust turbine can for example have a variable turbine geometry (VTG). The exhaust manifold 1 can be cast as one piece or—as shown—in two pieces with a segment 1a and a segment 1b, wherein the segments are joined together gas-tightly via a sealing sleeve 1c.

The exhaust manifold 1 functionally comprises an approximately linearly oriented, single-flow header pipe 4 and moulded thereon approximately horizontally branching connecting pieces 5, which are connected—forming the inflow openings 6—to the cylinder head (not shown) of the internal combustion engine or its exhaust ducts.

Furthermore an outlet opening 7 branching upwards (see also FIG. 4) is provided, to which the pipe connector 3 for the exhaust gas recirculation line is connected.

Figure 3:
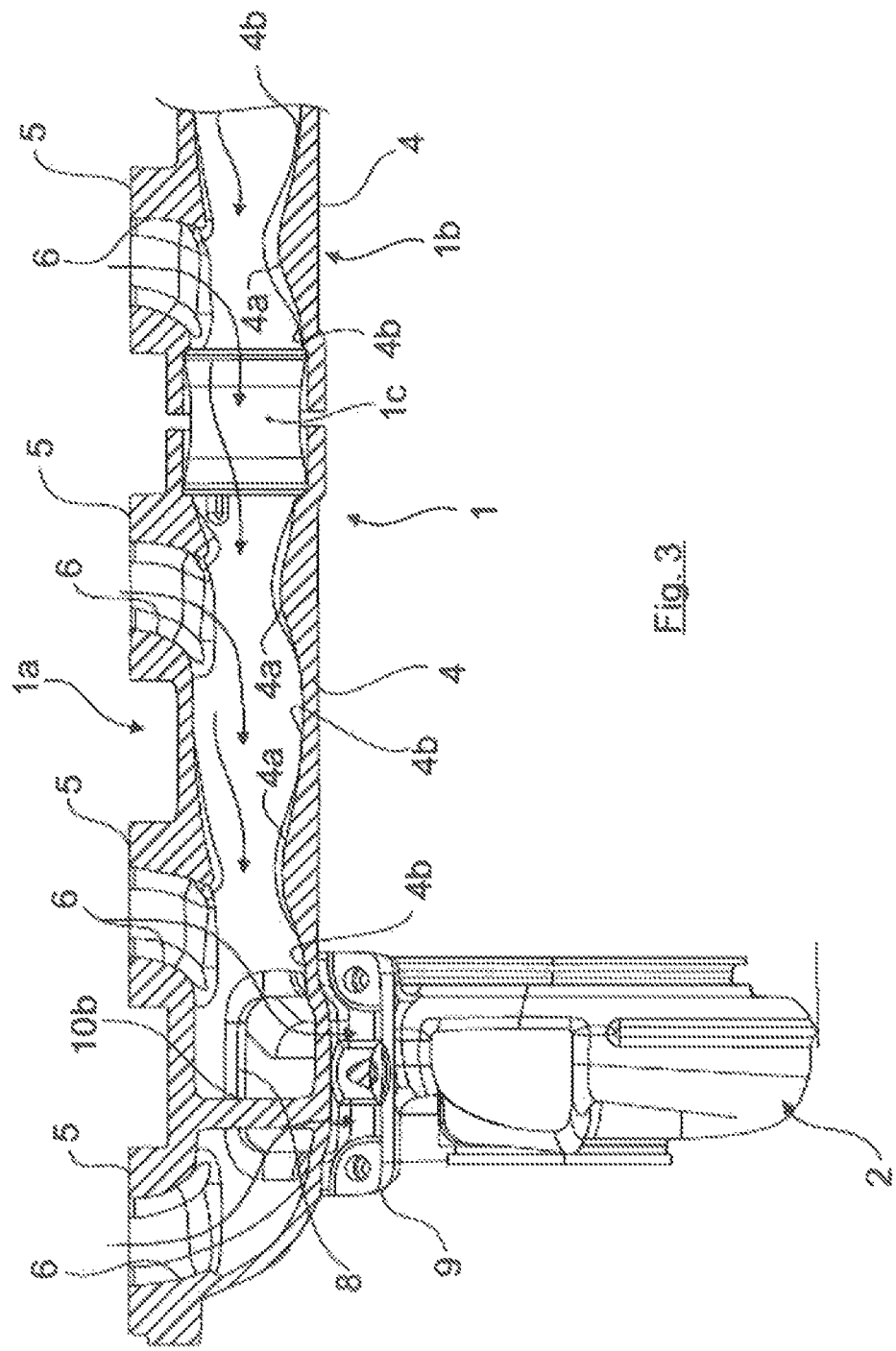
FIG. 3 shows a further section along the line III-III in FIG. 1 through the exhaust manifold with the undulating wall segments upstream of FIG. 4 shows the exhaust manifold in a view according to FIG. 2 in partial, enlarged depiction.

The turbine of the exhaust turbocharger 2 is connected to a downwards-branching outlet opening 8 at a moulded connection flange 9 (see FIG. 3).

The exhaust manifold 1 is designed here for example as a six-cylinder, in-line internal combustion engine with consequently six connecting pieces 5 and six inflow openings 6. The outlet openings 7, 8 branching transversely thereto upwards and downwards are positioned between the two inflow openings 6 of the last cylinders five and six in the exhaust gas flow direction (arrows drawn in FIGS. 2 to 4).

In this region, a flow guide element 10 (see in particular FIGS. 2 and 4) is cast in the exhaust manifold 1 or the header pipe 4 and divides the exhaust gas flow in the header pipe 4 onto the two outlet openings 7, 8 and/or for targeted exhaust gas recirculation and pressurization of the exhaust turbine of the exhaust turbocharger 2.

The flow guide element 10 is formed approximately Y-shaped in cross section viewed along line II-II (FIG. 1), with one guide wall 10a oriented in the direction of the header pipe 4 and two guide walls 10b and 10c bending towards the outlet openings 7, 8. As evident in particular from FIG. 4, the guide walls merge into each other in a rounded fashion via correspondingly formed curved segments (no reference numeral).

The flow guide element 10 or its guide walls 10a, 10b, 10c are cast onto the header pipe 4 (see FIG. 3, guide wall 10b) and designed fluidically such that they deflect the exhaust gas flowing out of the inlet openings 6 onto the outlet openings 7, 8 in a targeted division.

Figure 2:
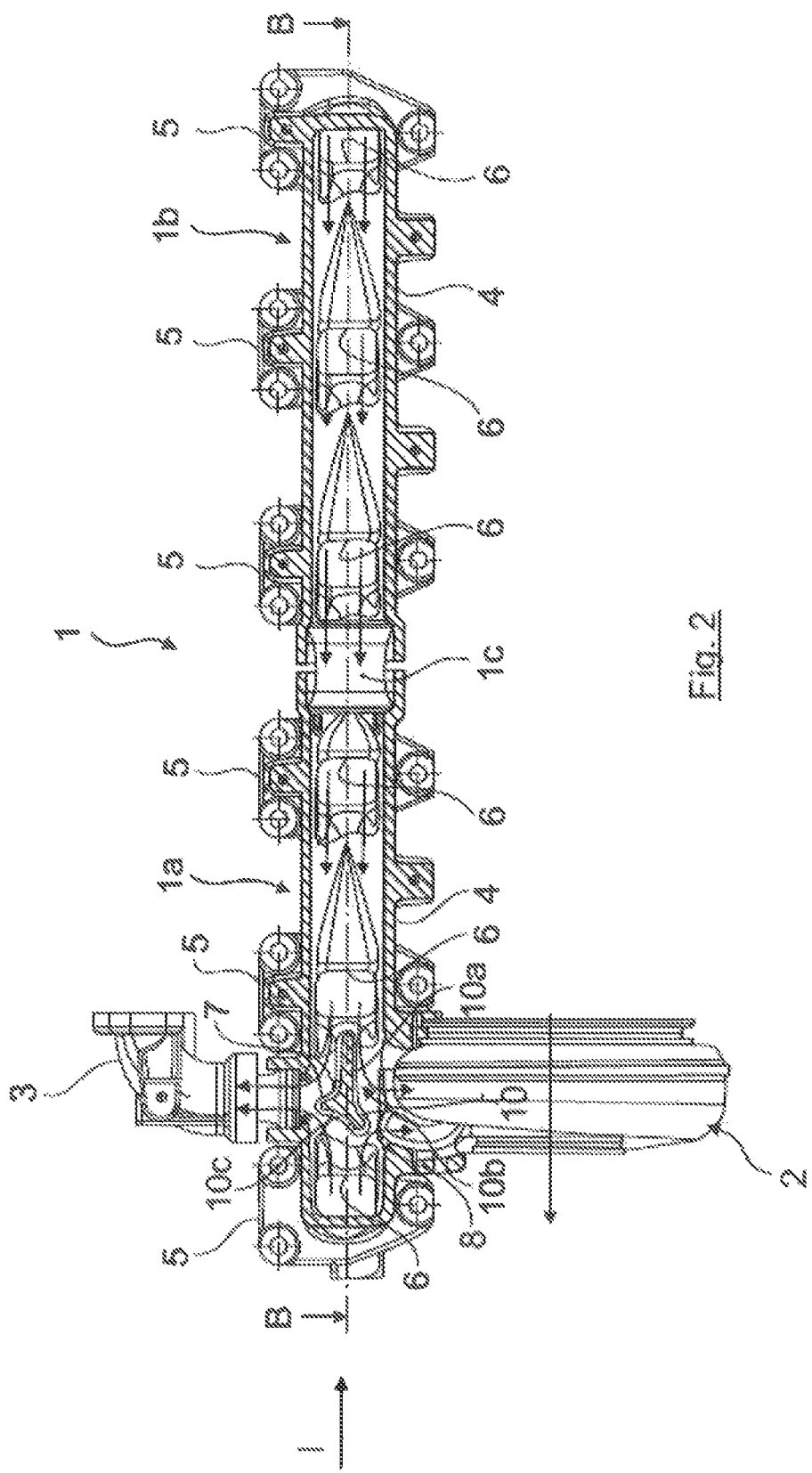
FIG. 2 shows a section along line II-II in FIG. 1 through the exhaust manifold with flow guide element integrated in the header pipe.
Figure 4:
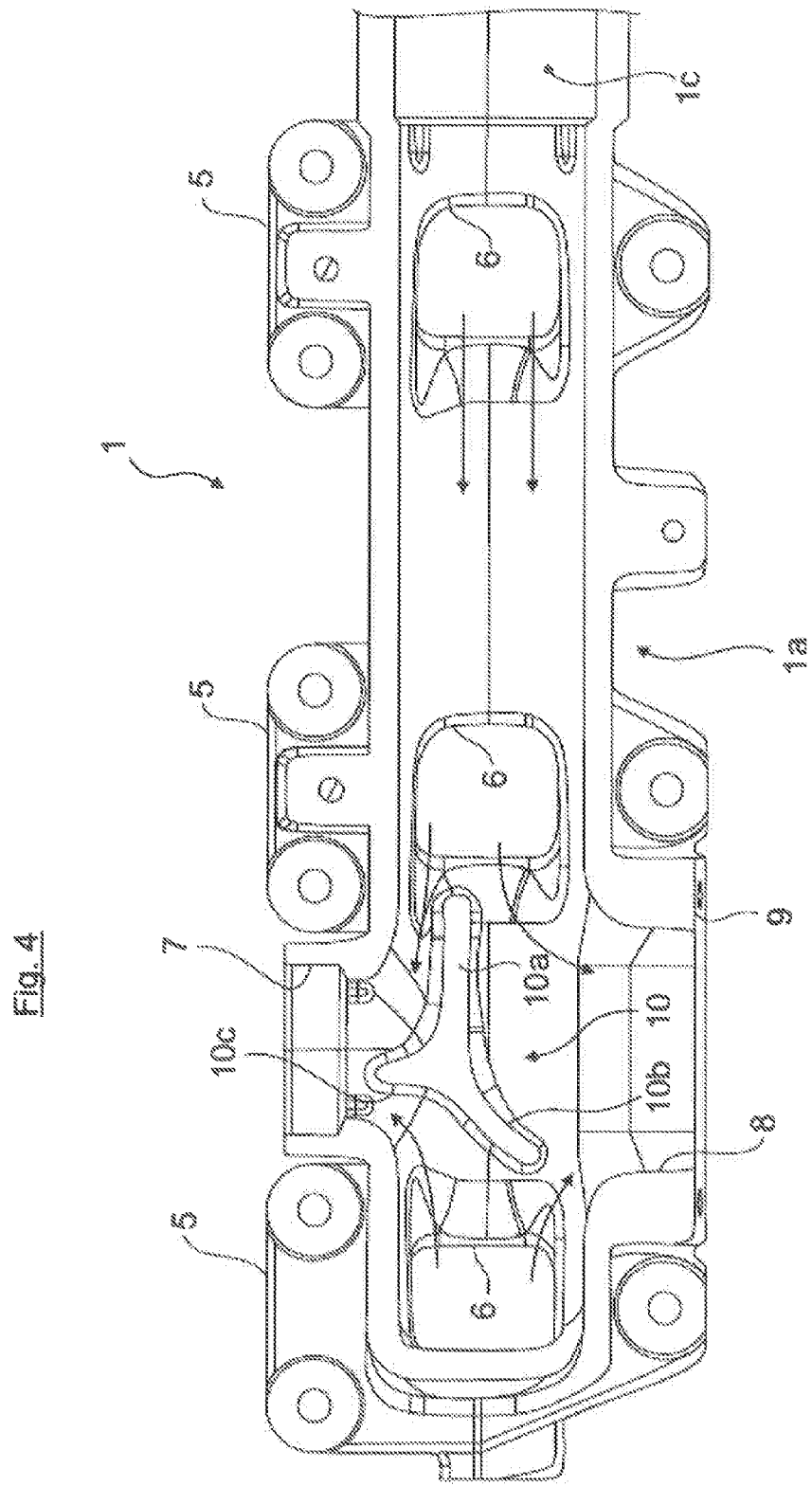

The Y-shaped configuration of the guide element 10 shown divides both the exhaust gas mass flow flowing to the left in the drawing from cylinders one to five, and the exhaust gas mass flow flowing in the opposite direction from cylinder six, avoiding turbulence or flow resistances, onto the two outlet openings 7 and 8 (see arrows drawn in FIGS. 2 and 4).

It is evident in particular from FIG. 4 that the guide element 10 or its guide walls 10a, 10b, 10c open larger flow cross sections and ensure a dynamically preferred flow guidance to the outlet opening 8, while the flow cross sections to the outlet opening 7 for the exhaust gas recirculation are significantly smaller.

When these cross sections are matched to the exhaust gas mass flows of the internal combustion engine, in a targeted manner firstly an effective pressurization of the exhaust turbocharger 2 can be achieved and secondly a high exhaust gas recirculation rate to the exhaust gas recirculation device 3.

For improved flow dynamics in the header pipe 4 (see FIG. 3), the wall segments opposite the inflow openings 6 of the header pipe 4 are formed undulating with peaks 4a and troughs 4b over a defined circumferential region (of for example 45°), wherein viewed in the flow direction of the exhaust gas, the undulation peaks 4a each lie in front of the inflow openings 6 and the troughs slightly behind these.

Furthermore the channel segments forming the inflow openings 6 in the connecting pieces 5 are formed inclined or curved in the exhaust gas flow direction, in order in combination with the undulating regions 4a, 4b to give the inflowing exhaust gas an improved flow deflection towards the linear header pipe 4.

The invention is not restricted to the embodiment example shown. In particular the exhaust manifold 1 can also be designed for other numbers of cylinders of the internal combustion engine with correspondingly arranged inflow openings 6.

The flow guide element 10, or where applicable multiple flow guide elements, for example in the case of four inflow openings 6, can be provided on the exhaust manifold symmetrically each between two inflow openings 6, wherein the guide element 10 would have to be modified accordingly.

The exhaust manifold 1 is preferably produced as a casting; where applicable also an assembled construction could be used with a correspondingly inserted flow guide element 10.

LIST OF REFERENCE NUMERALS

1 Exhaust manifold
1a Manifold segment
1b Manifold segment
2 Exhaust turbocharger
3 Pipe connector
4 Header pipe
4a Undulation peaks
4b Troughs
5 Connecting piece
6 Inflow openings
7 EGR outlet opening
8 ETC outlet opening
9 Connection flange
10 Flow guide element
10a-10c Guide walls

The invention claimed is:

1. An exhaust manifold for an internal combustion engine in motor vehicles with exhaust turbocharging and an exhaust gas recirculation device for recirculating exhaust gas from the exhaust manifold to the engine inlet, wherein the exhaust manifold comprises:
a header pipe with several inflow openings connected with the combustion chambers of the internal combustion engine, and outlet openings branching from the header pipe via connecting branches for the exhaust gas recirculation and the exhaust turbocharger, and
a flow guide element arranged in the header pipe proximate the outlet openings, the flow guide element having three guide walls and dividing an exhaust gas flow in the header onto the outlet openings in a targeted manner,
wherein the flow guide element is approximately Y-shaped in cross section with one of the guide walls oriented in a flow direction of the exhaust gas in the header pipe and two further ones of the guide walls each extending toward a respective one of the outlet openings.

2. The exhaust manifold according to claim 1, wherein the outlet openings for the exhaust gas recirculation and the exhaust turbocharger branch from the header pipe are diametrically opposed, and the flow guide element deflects the exhaust gas flow onto the outlet openings.

3. The exhaust manifold according to claim 1, wherein the guide walls of the flow guide element merge into each other with flow-deflecting curved segments.

4. The exhaust manifold according to claim 1, wherein on an approximately horizontal inflow of exhaust gas through the inflow openings, the outlet opening for the exhaust gas recirculation is oriented transversely thereto upwards and the outlet opening to the exhaust turbocharger transversely thereto downwards.

5. The exhaust manifold according to claim 1, wherein the outlet openings for the exhaust gas recirculation and the exhaust turbocharger are disposed between two adjacent inflow openings of the header pipe and the flow guide element is arranged between the two adjacent inflow openings and deflects opposing exhaust gas flow from the two adjacent inflow openings onto the outlet openings.

6. The exhaust manifold according to claim 5, wherein the flow guide element is moulded and/or cast on diametrically opposed wall segments of the header pipe between the adjacent inflow openings.

7. The exhaust manifold according to claim 1, wherein the header pipe is adapted for a connection of at least two cylinders of the internal combustion engine and the outlet openings for the exhaust gas recirculation and the exhaust turbocharger are arranged between the last two inflow openings in the flow direction of the exhaust gas.

8. The exhaust manifold according to claim 7, wherein the header pipe is adapted for the connection of six cylinders.

9. The exhaust manifold according to claim 1, wherein wall segments opposite the inflow openings in the header pipe are formed undulating such that viewed in the flow direction of the exhaust gas, respective undulation peaks are positioned in front of respective ones of the inflow openings.

10. The exhaust manifold according to claim 9, wherein the connecting pieces or pipe guides surrounding the inflow openings and cast onto the header pipe are formed inclined or curved in the flow direction of the exhaust gas in the header pipe.

11. A vehicle with an exhaust manifold according to claim 1.

* * * * *